United States Patent
Nishizawa et al.

(10) Patent No.: US 9,419,307 B2
(45) Date of Patent: Aug. 16, 2016

(54) ORGANIC ELECTROLYTE AND ORGANIC ELECTROLYTE STORAGE BATTERY

(71) Applicant: JX Nippon Oil & Energy Corporation, Tokyo (JP)

(72) Inventors: Takeshi Nishizawa, Tokyo (JP); Atsuo Omaru, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 58 days.

(21) Appl. No.: 14/355,627

(22) PCT Filed: Nov. 20, 2012

(86) PCT No.: PCT/JP2012/080063
§ 371 (c)(1),
(2) Date: May 1, 2014

(87) PCT Pub. No.: WO2013/077320
PCT Pub. Date: May 30, 2013

(65) Prior Publication Data
US 2014/0302387 A1  Oct. 9, 2014

(30) Foreign Application Priority Data
Nov. 22, 2011  (JP) ................................. 2011-254785

(51) Int. Cl.
*H01M 10/0567* (2010.01)
*H01M 10/052* (2010.01)
*H01M 10/0525* (2010.01)

(52) U.S. Cl.
CPC ........ *H01M 10/0567* (2013.01); *H01M 10/052* (2013.01); *H01M 10/0525* (2013.01); *H01M 2220/20* (2013.01); *H01M 2300/0025* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 5,776,627 A | 7/1998 | Mao et al. | |
| 5,879,834 A | 3/1999 | Mao | |
| 6,074,777 A | 6/2000 | Reimers et al. | |
| 6,682,856 B1 | 1/2004 | Watanabe et al. | |
| 2004/0229128 A1 | 11/2004 | Noh | |
| 2005/0142448 A1 | 6/2005 | Kim et al. | |

FOREIGN PATENT DOCUMENTS

| | | |
|---|---|---|
| JP | H09-106835 A | 4/1997 |
| JP | H09-171840 A | 6/1997 |
| JP | H11-162512 A | 6/1999 |
| JP | 2001-015154 A | 1/2001 |
| JP | 2003151621 A | 5/2003 |
| JP | 2003-229170 A | 8/2003 |
| JP | 2004-063114 A | 2/2004 |
| JP | 2004319517 A | 11/2004 |
| JP | 2004-342585 A | 12/2004 |
| JP | 2005-142157 A | 6/2005 |
| JP | 2007-172968 A | 7/2007 |
| JP | 2009-272170 A | 11/2009 |
| KR | 20080049546 A | 6/2008 |

OTHER PUBLICATIONS

English translation of Onuki JP 2003-229170 published Aug. 15, 2003. Obtained Sep. 12, 2015 from the JPO website.*
Int'l Search Report issued Feb. 12, 2013 in Int'l Application No. PCT/JP2012/080063.
Search Report issued Oct. 8, 2015 in EP App No. 12850849.6.

* cited by examiner

*Primary Examiner* — Sarah A Slifka
(74) *Attorney, Agent, or Firm* — Panitch Schwarze Belisario & Nadel LLP

(57) ABSTRACT

An organic electrolyte improves the organic electrolyte storage battery of an electric vehicle in the initial storage capacity that affects the possible cruising range. The electrolyte includes a compound represented by formula (1) below and a compound represented by formula (2) below:

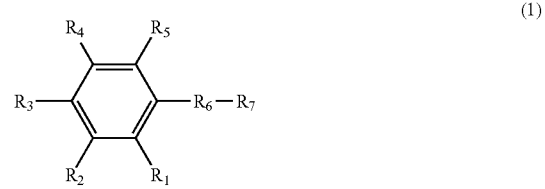

(1)

wherein $R_1$ to $R_5$ are each independently hydrogen, an alkyl group, a halogenated alkyl group, or halogen, $R_6$ is an alkylene group or a halogenated alkylene group and $R_7$ is a group having a symmetrical structure about $R_6$ as the rotational axis;

$$R_1-R_2-R_3 \qquad (2)$$

wherein $R_2$ is a vinyl group, a cyclic carbonic acid ester group, cyclic sulfite group, chain carbonic acid ester group or chain sulfite group, or $-SO_3-$, $R_1$ and $R_3$ are each independently hydrogen, a halogen, an alkyl group, a halogenated alkyl group, or a vinyl, phenyl or cyclohexyl group, and when $R_2$ is $-SO_3-$, $R_1$ and $R_3$ may bond to each other to form a ring.

10 Claims, 2 Drawing Sheets

ORGANIC ELECTROLYTE AND ORGANIC ELECTROLYTE STORAGE BATTERY

CROSS-REFERENCE TO RELATED APPLICATION

This application is a Section 371 of International Application No. PCT/JP2012/080063, filed Nov. 20, 2012, which was published in the Japanese language on May 30, 2013, under International Publication No. WO 2013/077320 A1, and the disclosure of which is incorporated herein by reference.

TECHNICAL FIELD

The present invention relates to organic electrolytes and organic electrolyte storage batteries produced using the same.

BACKGROUND ART

In recent years, hybrid electric vehicles (HEV), plug-in hybrid electric vehicles (PHEV), battery electric vehicles (BEV) have been developed and commercialized from the viewpoint of environmental protection and energy saving. As the energy source of such electric vehicle, a large-scale secondary battery which is repeatedly chargeable and dischargeable is an essential technology. In particular, an organic electrolyte storage battery is a potent battery because it is higher in operating voltage and more likely to produce high power than the other secondary batteries containing a nickel-hydrogen cell and thus becomes increasingly important as the electric power source of an electric vehicle. Various developments therefore have been made. For example, it has been proposed to use various additives in order to guarantee a safety against burning or the like of a lithium-ion battery in overcharged state (for example, see Patent Literatures 1 to 3 below).

On the other hand, an improvement in initial storage capacity that affects the possible cruising range has been sought. That is, the BEV, among the electric vehicles, is driven only by an electric motor with a secondary battery as the power source and thus the cruising range is determined by the capacity of the battery. An electric vehicle equipped with a larger capacity of battery can, therefore, travel a longer distance but the electric energy (initial storage capacity) that can be installed on a single vehicle is limited.

CITATION LIST

Patent Literature

[Patent Literature 1] Japanese Patent Application Laid-Open Publication No. 9-106835
[Patent Literature 2] Japanese Patent Application Laid-Open Publication No. 9-171840
[Patent Literature 3] Japanese Patent Application Laid-Open Publication No. 11-162512

SUMMARY OF INVENTION

Technical Problem

The present invention has an object to improve the initial storage capacity of the organic electrolyte storage battery that affects the possible cruising range of an electric vehicle.

Solution to Problem

As the result of extensive studies to achieve the above object, the present invention has been accomplished on the basis of the finding that addition of a specific compound to an organic electrolyte improves the initial storage capacity.

The present invention relates to an organic electrolyte containing a compound represented by formula (1) below and a compound represented by formula (2) below:

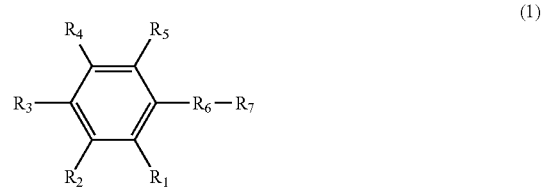

wherein $R_1$ to $R_5$ are each independently hydrogen, a straight-chain or branched alkyl group having one to four carbon atoms, a halogen-containing straight-chain or branched alkyl group having one to four carbon atoms, or halogen, $R_6$ is a straight-chain or branched alkylene group having one to four carbon atoms or a halogen-containing straight-chain or branched alkylene group having one to four carbon atoms, $R_7$ is a phenyl group having no substituent or having a substituent (a straight-chain or branched alkyl group having one to four carbon atoms, halogen-containing straight-chain or branched alkyl group having one to four carbon atoms, or halogen) bonded thereto and has a symmetrical structure about $R_6$ as the rotational axis;

wherein $R_2$ is a vinyl group having no substituent or having a substituent bonded thereto, a cyclic carbonic acid ester group, cyclic sulfite group, chain carbonic acid ester group or chain sulfite group, having no substituent or having a substituent bonded thereto, or $-SO_3-$, $R_1$ and $R_3$ are each independently hydrogen, a halogen, a straight-chain or branched alkyl group having one to four carbon atoms, a halogen-containing straight-chain or branched alkyl group having one to four carbon atoms, or a vinyl, phenyl or cyclohexyl group, having no substituent or having a substituent bonded thereto, and when $R_2$ is $-SO_3-$, $R_1$ and $R_3$ may bond to each other to form a ring.

The present invention also relates to the foregoing organic electrolyte wherein the compound represented by formula (1) is contained in an amount of 0.04 to 15 percent by mass in the organic electrolyte.

The present invention also relates to any of the foregoing organic electrolytes wherein the compound represented by formula (2) is contained in an amount of 0.005 to 20 percent by mass in the organic electrolyte.

The present invention also relates to any of the foregoing organic electrolytes wherein the blend ratio of the compound represented by formula (1) and the compound represented by formula (2) is 1:0.01 to 10 by weight ratio.

The present invention also relates to any of the foregoing organic electrolytes wherein the compound represented by formula (1) is 1,1-diphenylethane.

The present invention also relates to any of the foregoing organic electrolytes wherein the compound represented by formula (2) is 1,1-diphenylethylene.

The present invention also relates to any of the foregoing organic electrolytes wherein the compound represented by formula (2) is fluoroethylene carbonate.

The present invention also relates to any of the foregoing organic electrolytes wherein the compound represented by formula (2) is vinylene carbonate and contained in an amount of 0.005 to 7 percent by mass in the organic electrolyte.

The present invention also relates to any of the foregoing organic electrolytes wherein the compound represented by formula (2) is vinylethylene carbonate and contained in an amount of 0.005 to 5 percent by mass in the organic electrolyte.

The present invention also relates to any of the foregoing organic electrolytes wherein it contains a high-dielectric solvent in an amount of 5 to 45 percent by volume.

The present invention also relates to an organic electrolyte storage battery comprising any of the foregoing organic electrolytes.

Advantageous Effect of Invention

The use of the organic electrolyte of the present invention comprising a compound represented by formula (1) and a compound represented by formula (2) enables the initial storage capacity of a secondary battery to increase. Therefore, equipping an electric vehicle with a secondary battery containing the organic electrolyte of the present invention enables the electric energy that can be installed on a single vehicle to increase and thus enables the possible cruising range to extend.

DESCRIPTION OF EMBODIMENTS

Figure 1:
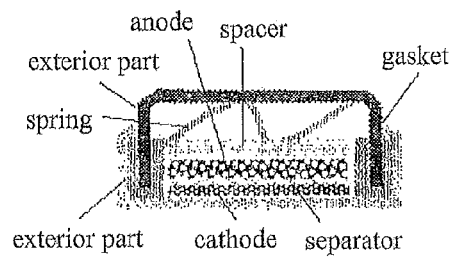
FIG. 1 is a schematic sectional view showing a coin type organic electrolyte storage battery

The present invention will be described in more detail below.

The present invention is an organic electrolyte comprising a compound represented by formula (1) below and a compound represented by formula (2) below.

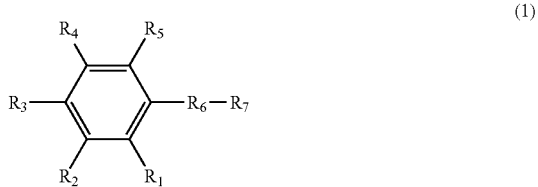
(1)

In formula (1), $R_1$ to $R_5$ are each independently hydrogen, a straight-chain or branched alkyl group having one to four carbon atoms, halogen-containing straight-chain or branched alkyl group having one to four carbon atoms, or a halogen, $R_6$ is a straight-chain or branched alkylene group having one to four carbon atoms or a halogen-containing straight-chain or branched alkylene group having one to four carbon atoms, $R_7$ is a phenyl group having no substituent or having a substituent (a straight-chain or branched alkyl group having one to four carbon atoms, a halogen-containing straight-chain or branched alkyl group having one to four carbon atoms, or a halogen) bonded thereto and has a symmetrical structure about $R_6$ as the rotational axis.

(2)

In formula (2), $R_2$ is a vinyl group having no substituent or having a substituent bonded thereto, a cyclic carbonic acid ester group, cyclic sulfite group, chain carbonic acid ester group, or chain sulfite group, having no substituent or having a substituent bonded thereto, or —$SO_3$—, $R_1$ and $R_3$ are each independently hydrogen, a halogen, a straight-chain or branched alkyl group having one to four carbon atoms, a halogen-containing straight-chain or branched alkyl group having one to four carbon atoms, or a vinyl, phenyl, or cyclohexyl group, having no substituent or having a substituent bonded thereto. When $R_2$ is —$SO_3$—, $R_1$ and $R_3$ may bond to each other to form a ring. The halogen is preferably fluorine, chlorine, or bromine.

The compound represented by formula (1) is a compound having a symmetrical structure about $R_6$ as the rotational axis.

Specific examples of compounds represented by formula (1) include 1,1-diphenylethane, 1,2-diphenylethane, 2,2-diphenylpropane, 1,1-diphenylpropane, 1,3-diphenylpropane, 1,4-diphenylbutane, diphenylmethane, bis(2-methylphenyl)methane, bis(3-methylphenyl)methane, bis(4-methylphenyl)methane, bis(2-ethylphenyl)methane, bis(3-ethylphenyl)methane, bis(4-ethylphenyl)methane, bis(2-(isopropylphenyl)methane, bis(3-(isopropylphenyl)methane, bis(4-(isopropylphenyl)methane, bis(2,5-dimethylphenyl)methane, bis(3,4-dimethylphenyl)methane, bis(3,5-dimethylphenyl)methane, bis(3,4,5-trimethylphenyl)methane, 1,1-bis(2-methylphenyl)ethane, 1,1-bis(3-methylphenyl)ethane, 1,1-bis(4-methylphenyl)ethane, 1,1-bis(2-ethylphenyl)ethane, 1,1-bis(3-ethylphenyl)ethane, 1,1-bis(4-ethylphenyl)ethane, 1,1-bis(2-(isopropylphenyl)ethane, 1,1-bis(3-(isopropylphenyl)ethane, 1,1-bis(4-(isopropylphenyl)ethane, 1,1-bis(2,5-dimethylphenyl)ethane, 1,1-bis(3,4-dimethylphenyl)ethane, 1,1-bis(3,5-dimethylphenyl)ethane, 1,1-bis(3,4,5-trimethylphenyl)ethane, 1,2-bis(2-methylphenyl)ethane, 1,2-bis(3-methylphenyl)ethane, 1,2-bis(4-methylphenyl)ethane, 1,2-bis(2-ethylphenyl)ethane, 1,2-bis(3-ethylphenyl)ethane, 1,2-bis(4-ethylphenyl)ethane, 1,2-bis(2-(isopropylphenyl)ethane, 1,2-bis(3-(isopropylphenyl)ethane, 1,2-bis(4-(isopropylphenyl)ethane, 1,2-bis(2,5-dimethylphenyl)ethane, 1,2-bis(3,4-dimethylphenyl)ethane, 1,2-bis(3,5-dimethylphenyl)ethane, 1,2-bis(3,4,5-trimethylphenyl)ethane, 2,2-bis(2-methylphenyl)propane, 2,2-bis(3-methylphenyl)propane, 2,2-bis(4-ethylphenyl)propane, 2,2-bis(2-ethylphenyl)propane, 2,2-bis(3-ethylphenyl)propane, 2,2-bis(2-(isopropylphenyl)propane, 2,2-bis(3-(isopropylphenyl)propane, 2,2-bis(4-(isopropylphenyl)propane, 2,2-bis(2,5-dimethylphenyl)propane, 2,2-bis(3,4-dimethylphenyl)propane, 2,2-bis(3,5-dimethylphenyl)propane, 2,2-bis(3,4,5-trimethylphenyl)propane, 1,4-diphenylbutane, 2-methyl-1,1-diphenylpropane, 2,3-diphenylbutane, bis(3-fluorophenyl)methane, bis(2,5-difluorophenyl)methane, bis(3,4-difluorophenyl)methane, bis(3,5-difluorophenyl)methane, bis(3,4,5-trifluorophenyl)methane, 1,1-bis(3-fluorophenyl)ethane, 1,1-bis(2,5-difluorophenyl)ethane, 1,1-bis(3,4-difluorophenyl)ethane, 1,1-bis(3,5-difluorophenyl)ethane, 1,1-bis(3,4,5-trifluorophenyl)ethane, 1,2-bis(3-fluorophenyl)ethane, 1,2-bis(2,5-difluorophenyl)ethane, 1,2-bis(3,4-difluorophenyl)ethane, 1,2-bis(3,5-difluorophenyl)ethane, 1,2-bis(3,4,5-trifluorophenyl)ethane, 2,2-bis(3-fluorophenyl)propane, 2,2-bis(2,5-difluorophenyl)propane, 2,2-bis(3,4-difluorophenyl)propane, 2,2-bis(3,5-difluorophenyl)propane, 2,2-bis(3,4,5-trifluorophenyl)propane, 2,2-diphenyl-1,1,1,3,3,3-hexafluoropropane, 1,1,1,3,3,3- hexafluoro-2,2-bis(2-methylphenyl) propane, 1,1,1,3,3,3-hexafluoro-2,2-bis(3-methylphenyl) propane, 1,1,1,3,3,3-hexafluoro-2,2-bis(4-methylphenyl) propane, 2,2-bis(2-ethylphenyl)-1,1,1,3,3,3-hexafluoropropane, 2,2-bis(3-ethylphenyl)-1,1,1,3,3,3-hexafluoropropane, 2,2-bis(4-ethylphenyl)-1,1,1,3,3,3-hexafluoropropane, 1,1,1,3,3,3-hexafluoro-2,2-bis(2-isopropylphenyl)propane, 1,1,1,3,3,3-hexafluoro-2,2-bis(3-isopropylphenyl)propane, 1,1,1,3,3,3-hexafluoro-2,2-bis(4-isopropylphenyl)propane, 2,2-bis(2,5-dimethylphenyl)-1,1,1,3,3,3-hexafluoropropane, 2,2-bis(3,4-dimethylphenyl)-1,1,1,3,3,3-hexafluoropropane, 2,2-bis(3,5-dimethylphenyl)-1,1,1,3,3,3-hexafluoropropane, 1,1,1,3,3,3-hexafluoro-2,2-bis(3,4,5-trimethylphenyl)propane, 2,2-bis(3-fluorophenyl)-1,1,1,3,3,3-hexafluoropropane, 2,2-bis(2,5-difluorophenyl)-1,1,1,3,3,3-hexafluoropropane, 2,2-bis(3,4-difluorophenyl)-1,1,1,3,3,3-hexafluoropropane, 2,2-bis(3,5-difluorophenyl)-1,1,1,3,3,3-hexafluoropropane, and 1,1,1,3,3,3-hexafluoro-2,2-bis(3,4,5-trifluorophenyl)propane.

Specific examples of compounds represented by formula (2) include vinylene carbonate, vinylethylene carbonate, fluoroethylene carbonate, difluoroethylene carbonate, methyltrifluoroethyl carbonate, ditrifluoroethyl carbonate, and ethyltrifluoroethyl carbonate.

The compound represented by formula (2) also includes compounds represented by the following formulas (3) to (7).

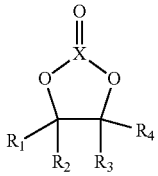

(3)

In formula (3), X is carbon or sulfur, $R_1$ is a vinyl group, a halogen, a halogen-containing straight-chain or branched alkyl group having one to four carbon atoms, and $R_2$ to $R_4$ are each independently hydrogen, a straight-chain or branched alkyl group having one to four carbon atoms, a halogen-containing straight-chain or branched alkyl group having one to four carbon atoms, or halogen.

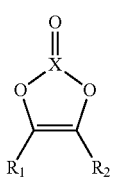

(4)

In formula (4), X is carbon or sulfur, $R_1$ and $R_2$ are each independently hydrogen, a straight-chain or branched alkyl group having one to four carbon atoms, a vinyl group- or halogen-containing straight-chain or branched alkyl group having one to four carbon atoms, or halogen.

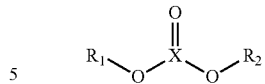

(5)

In formula (5), X is carbon or sulfur, $R_1$ is a halogen- or vinyl group-containing straight-chain or branched alkyl group having one to four carbon atoms, and $R_2$ is a straight-chain or branched alkyl group having one to four carbon atoms or a halogen- or vinyl group-containing alkyl group having one to four carbon atoms.

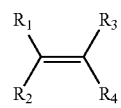

(6)

In formula (6), $R_1$, $R_2$ and $R_3$ are each independently hydrogen, halogen, an alkyl or halogenated alkyl group having one to four carbon atoms, a phenyl group or cyclohexyl group, having no substituent or having a substituent bonded thereto, and $R_4$ is a phenyl group or cyclohexyl group, having no substituent or having a substituent bonded thereto.

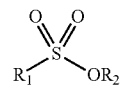

(7)

In formula (7), $R_1$ and $R_2$ are each independently hydrogen or an alkyl group or halogenated alkyl group having one to four carbon atoms. $R_1$ and $R_2$ may bond to each other to form a ring.

Specific examples of compounds represented by formula (3) include, vinylethylene carbonate, fluoroethylene carbonate, difluoroethylene carbonate, trifluoromethylethylene carbonate, trifluoroethylethylene carbonate, vinylethylene sulfite, fluoroethylene sulfite, difluoroethylene sulfite, trifluoromethylethylene sulfite, and trifluoroethylethylene sulfite.

Specific examples of compounds represented by formula (4) include fluorovinylene carbonate, difluorovinylene carbonate, trifluoromethylvinylene carbonate, trifluoroethylvinylene carbonate, fluorovinylene sulfite, difluorovinylene sulfite, trifluoromethylvinylene sulfite, trifluoroethylvinylene sulfite, and vinylene sulfite.

Specific examples of compounds represented by formula (5) include methyltrifluoroethyl carbonate, ditrifluoroethyl carbonate, ethyltrifluoroethyl carbonate, methyltrifluoroethyl sulfite, ditrifluoroethyl sulfite, and ethyltrifluoroethyl sulfite.

Specific examples of compounds represented by formula (6) include 1,1-diphenylethylene, cis-1,2-diphenylethylene, tran-1,2-diphenylethylene, 1-phenyl-1-(3,4-dimethylphenyl) ethylene, 1-phenyl-1-(2,4-dimethylphenylene)ethylene, 1-phenyl-1-(2,5-dimethylphenyl)ethylene, 1-phenyl-1-(2-ethylphenyl)ethylene, 1-phenyl-1-(3-ethylphenyl)ethylene, 1-phenyl-1-(4-ethylphenyl)ethylene, 1-phenyl-1-(2-methylphenyl)ethylene, 1-phenyl-1-(3-methylphenyl)ethylene, 1-phenyl-1-(4-methylphenyl)ethane, 1-(2-methylphenyl)-1-(4-methylphenyl)ethylene, 1-(2-methylphenyl)-1-(3-methylphenyl)ethylene, 1-(3-methylphenyl)-1-(4-methylphenyl) ethylene, 1-phenyl-1-(4-isobutylphenyl)ethylene, 1-phenyl- 1-(2-isobutylphenyl)ethylene, 1-phenyl-1-(3-isobutylphenyl)ethylene, 1-phenyl-1-(4-isopropylphenyl)ethylene, 1-phenyl-1-(2-isopropylphenyl)ethylene, 1-phenyl-1-(3-isopropylphenyl)ethylene, cis-1-(3,4-dimethylphenyl)-2-phenylethylene, trans-1-(3,4-dimethylphenyl)-2-phenylethylene, cis-1-(2,4-dimethylphenyl)-2-phenylethylene, trans-1-(2,4-dimethylphenyl)-2-phenylethylene, cis-1-(2,5-dimethylphenyl)-2-phenylethylene, trans-1-(2,5-dimethylphenyl)-2-phenylethylene, cis-1-(2-ethylphenyl)-2-phenylethylene, trans-1-(2-ethylphenyl)-2-phenylethylene, cis-1-(3-ethylphenyl)-2-phenylethylene, trans-1-(3-ethylphenyl)-2-phenylethylene, cis-1-(4-ethylphenyl)-2-phenylethylene, trans-1-(4-ethylphenyl)-2-phenylethylene, cis-1-(2-methylphenyl)-2-phenylethylene, trans-1-(2-methylphenyl)-2-phenylethylene, cis-1-(3-methylphenyl)-2-phenylethylene, trans-1-(3-methylphenyl)-2-phenylethylene, cis-1-(4-methylphenyl)-2-phenylethylene, trans-1-(4-methylphenyl)-2-phenylethylene, cis-1-(2-methylphenyl)-2-(4-methylphenyl)ethylene, trans-1-(2-methylphenyl)-2-(4-methylphenyl)ethylene, cis-1-(2-methylphenyl)-2-(3-methylphenyl)ethylene, trans-1-(2-methylphenyl)-2-(3-methylphenyl)ethylene, cis-1-(3-methylphenyl)-2-(4-methylphenyl)ethylene, trans-1-(3-methylphenyl)-2-(4-methylphenyl)ethylene, cis-1-(4-isobutylphenyl)-2-phenylethylene, trans-1-(4-isobutylphenyl)-2-phenylethylene, cis-1-(2-isobutylphenyl)-2-phenylethylene, trans-1-(2-isobutylphenyl)-2-phenylethylene, cis-1-(3-isobutylphenyl)-2-phenylethylene, trans-1-(3-isobutylphenyl)-2-phenylethylene, cis-1-(4-isopropylphenyl)-2-phenylethylene, trans-1-(4-isopropylphenyl)-2-phenylethylene, cis-1-(2-isopropylphenyl)-2-phenylethylene, trans-1-(2-isopropylphenyl)-2-phenylethylene, cis-1-(3-isopropylphenyl)-2-phenylethylene, trans-1-(3-isopropylphenyl)-2-phenylethylene, 1,1-dicyclohexylethylene, cis-1,2-dicylohexylethylene, and trans-1,2-dicylohexylethylene.

Specific examples of compounds represented by formula (7) include 1,3-propane sultone, 1,4-butane sultone, and 2,4-butane sultone.

In the present invention, the organic electrolyte comprises one or more compound represented by formula (1) and one or more compound represented by formula (2).

The blend ratio of the compound represented by formula (1) is 0.04 percent by mass or more, preferably 0.1 percent by mass or more, more preferably 0.5 percent by mass or more in the organic electrolyte, and the upper limit is 15 percent by mass or less, preferably 10 percent by mass or less, more preferably 5 percent by mass or less. If the blend ratio of the compound represented by formula (1) is less than 0.04 percent by mass, the advantageous effects of the present invention may not be attained. If the blend ratio is more than 15 percent by mass, the electrolyte salt would be reduced in solubility or the organic electrolyte would be increased in viscosity, possibly causing deterioration in the performances of the secondary battery.

The blend ratio of the compound represented by formula (2) is 0.005 percent by mass or more, preferably 0.1 percent by mass or more, more preferably 0.5 percent by mass or more in the organic electrolyte, and the upper limit is 20 percent by mass or less, preferably 10 percent by mass or less, more preferably 5 percent by mass or less. If the blend ratio of the compound represented by formula (2) is less than 0.005 percent by mass, the advantageous effects of the present invention may not be attained. If the blend ratio is more than 20 percent by mass, the electrolyte salt would be reduced in solubility or the organic electrolyte would be increased in viscosity, possibly causing the deterioration in the performances of the secondary battery.

When the compound represented by formula (2) is vinylene carbonate, the upper limit blend ratio thereof is preferably 7 percent by mass or less. When the compound is vinylethylene carbonate, the blend ratio thereof is preferably 5 percent by mass or less. When the compound is 1,1-diphenylethylene, the blend ratio thereof is preferably less than 1 percent by mass.

With regard to the blend ratio of the compound represented by formula (1) and the compound represented by formula (2), the compound represented by formula (1): the compound represented by formula (2) is preferably in the range of 1:0.01 to 10, more preferably 1:0.02 to 8, more preferably 1:0.05 to 5 by weight ratio.

The purity of each of the compounds represented by formulas (1) and (2) is preferably 95% or higher, more preferably 98% or higher, more preferably 99% or higher. If the purity is lower than 95%, impurities that inhibit the advantageous effects of the present invention can be contained, and thus the original effects may not be obtained.

The organic electrolyte is composed of mainly an organic solvent and an electrolyte salt, and the organic solvent may be a high-dielectric solvent and a low viscosity solvent.

The content ratio of high-dielectric solvent in the organic electrolyte is preferably from 5 to 45 percent by volume, more preferably from 10 to 40 percent by volume, more preferably from 15 to 38 percent by volume.

The content ratio of the low viscosity solvent in the organic electrolyte is preferably from 55 to 95 percent by volume, more preferably from 60 to 90 percent by volume, more preferably 62 to 85 percent by volume.

Examples of the above-described high-dielectric solvent include ethylene carbonate, propylene carbonate and also for example butylene carbonate, γ-butyrolactone, γ-valerolactone, tetrahydrofuran, 1,4-dioxane, N-methyl-2-pyrrolidone, N-methyl-2-oxazolidinone, sulfolane, and 2-methylsulforane.

Examples of the low viscosity solvent include dimethyl carbonate, diethyl carbonate, ethylmethyl carbonate and also for example methylpropyl carbonate, methylisopropyl carbonate, ethylpropyl carbonate, dipropyl carbonate, methylbutyl carbonate, dibutyl carbonate, dimethoxyethane, methyl acetate, ethyl acetate, propyl acetate, isopropyl acetate, butyl acetate, isobutyl acetate, methyl propionate, ethyl propionate, methyl formate, ethyl formate, methyl butyrate, and methyl isobutyrate.

Examples of the electrolyte salt include inorganic lithium salts such as lithium hexafluorophosphate ($LiPF_6$), lithium tetrafluoroborate ($LiBE_4$), lithium hexafluoroarsenate ($LiAsF_6$), lithium hexafluoroantimonate ($LiSbF_6$), lithium perchlorate ($LiClO_4$) and lithium tetrachloroaluminate ($LiAlCl_4$), and lithium salts of perfluoroalkane sulfonic acid derivatives such as lithium trifluoromethanesulfonate ($CF_3SO_3Li$), lithium bis(trifluoromethanesulfone)imide [$(CF_3SO_2)_2NLi$], lithium bis(pentafluoroethanesulfone)imide [$(C_2F_5SO_2)_2NLi$] and lithium tris(trifluoromethanesulfone)methide [$(CF_3SO_2)_3CLi$]. The electrolyte salts may be used alone or in combination.

The electrolyte salt is usually contained in a concentration of 0.5 to 3 mol/L, preferably 0.8 to 2 mol/L, more preferably 1.0 to 1.6 mol/L in the organic electrolyte.

The present invention also provides an organic electrolyte storage battery produced using an organic electrolyte comprising a compound represented by formula (1) and a compound represented by formula (2).

For the organic electrolyte storage battery of the present invention, the cathode active material may be any material that can store and release lithium. For example, the cathode active material may be a lithium-containing complex oxide $LiMO_2$ (M is only one type or a mixture of two or more types selected from metals such as Mn, Fe, Co, and Ni, and may be partially substituted by other cations such as Mg, Al, or Ti), $LiMn_2O_4$, $LiMn_{0.5}Ni_{1.5}O_4$, or an olivine type material as typified by $LiFePO_4$ or $LiMnPO_4$. Other than these, a lithium-rich material such as $Li_2MnO_3$ or $Li_2MSiO_4$ (M is metal) may be used.

The cathode comprises preferably lithium and a transition metal, particularly preferably a layered oxide containing cobalt.

The anode may be an carbonaceous anode material containing an artificial graphite or natural graphite.

The anode active material may be an anode active material into which lithium is insertable or which is reactive with lithium. The anode active material is composed of mainly graphite but may be mixed with any of materials including carbon material such as amorphous carbon, a Li metal, a material forming an alloy with Li such as Si, Sn, or Al, a Si oxide, a Si complex oxide containing Si and metals other than Si, a Sn oxide, a Sn complex oxide containing Sn and metals other than Sn and $Li_4Ti_5O_{12}$.

The separator may be formed from an electrically insulative porous material, examples of which include polymer membranes or fibrous non-woven clothes that may be made of polyolefins such as polyethylene and polypropylene, polyester, polyethylene terephthalate, or polyimide. The materials may be used alone or in combination. Alternatively, the separator may be a single layer or a multi-layer (complex membrane). Alternatively, inorganic material nano particles of ceramic may be contained.

The both surfaces of the separator may be coated with a polymer compound such as polyvinylidene fluoride.

The organic electrolyte storage battery of the present invention may contain an electrolyte which turns into gel by inclusion of a polymer compound that swells due to the organic solvent and thus will be a retainer of the organic electrolyte. This is because a higher ion conductivity can be obtained by the polymer compound that swells due to the organic solvent thereby obtaining an excellent charge and discharge efficiency and preventing the liquid leakage from the battery. When the organic electrolyte contains such a polymer compound, the content thereof is preferably set in the range of 0.1 percent by mass or more to 10 percent by mass or less.

When a separator with the both surfaces coated with a polymer compound such as polyvinylidene fluoride is used, the mass ratio of the organic electrolyte and the polymer compound is preferably in the range of 50:1 to 10:1. With this range, a higher charge and discharge efficiency can be obtained.

Examples of the above-mentioned polymer compound include ether-based polymer compounds such as cross-linked bodies containing polyvinyl formal and polyethylene oxide, ester-based polymer compounds such as polymethacrylate, acrylic polymer compounds, polyvinylidene fluoride, and polymers of vinylidene fluoride such as copolymers of vinylidene fluoride and hexafluoropropylene. The polymer compounds may be used alone or in combination. In particular, fluorine polymer compounds such as polyvinylidene fluoride is desirously used from the viewpoint of an effect to prevent swelling during storage at high temperatures.

EXAMPLES

The present invention will be described in more detail with the following examples and comparative examples but is not limited thereto.

Herein, referring to FIG. 1, a coin type organic electrolyte storage battery will be described, but the organic electrolyte storage battery of the present invention is not limited to the use in such a coin type battery, and is applicable to for example, an organic electrolyte storage battery of button type, pouch type, prismatic type, or a cylindrical type with a spiral structure. The size of the organic electrolyte storage battery is also optional, and thus it can be large, small or thin.

FIG. 1 is a schematic sectional view showing the structure of a coin type organic electrolyte storage battery. This battery comprises a cathode 12 and an anode 14, laminated via a separator 15. The cathode 12, anode 14 and separator 15 each have a disc-like shape and accommodated in a space defined by meballic exterior parts 11 and 13. The interior defined by the exterior parts 11, 13 is filled with an organic electrolyte, and the periphery of the exterior parts 11, 13 is sealed by clumping a seal gasket 17. A metal spring 18 and a spacer 19 are disposed between the exterior part 13 and the anode 14.

The cathode was produced in the following manner. An active material: lithium cobalt oxide 85 percent by mass, a conductive agent: acetylene black 5 percent by mass, and a binder: poly(vinylidene fluoride) 10 percent by mass were mixed and to the mixture was added N-methylpyrrolidone (hereinafter abbreviated to "NMP"), followed by kneading thereby producing a slurry. The resulting slurry was put dropwise on an aluminum current collector, and then formed into film with a film applicator with a micrometer and a machine coater and dried in an oven at a temperature of 110° C., under a nitrogen atmosphere. The resulting cathode was punched out into a circular shape with a diameter of 15 mm and then pressed. The cathode active material had a mass of about 23 mg.

The anode was produced in the following manner. An active material: artificial graphite 94 percent by mass, a conductive agent: acetylene black 1 percent by mass, and a binder: poly (vinylidene fluoride) 5 percent by mass were mixed, and to the mixture was added NMP, followed by kneading thereby producing a slurry. The resulting slurry was put dropwise on a copper current collector, and then formed into film with a film applicator with a micrometer and a machine coater and dried in an oven at a temperature of 110° C., under a nitrogen atmosphere. The resulting anode is punched out into a circular shape with a diameter of 15 mm and then pressed. The anode active material had a mass of about 14 mg.

Coin type secondary batteries were produced using the cathode and anode produced above, a polypropylene-made separator punched out into a circular shape with a thickness of 25 micrometers and variously prepared organic electrolytes. Ethylene carbonate (hereinafter abbreviated to EC) that is a high-dielectric solvent and dimethyl carbonate (hereinafter abbreviated to DMC) that is a low viscosity solvent were used as an organic solvent, and were mixed at a volume ratio of 3:7 to produce a solvent in which $LiPF_6$ was dissolved at 1 mol/L. All of the compounds to be added to the above-described organic electrolytes were prepared to be 99% or higher in purity and added in an amount of 5 percent by mass of the electrolyte.

Example 1

As set forth in Table 1 below, compounds were mixed to prepare organic electrolytes and used for preparing coin type secondary batteries as described above.

TABLE 1

| Battery | Compound (the values in the parenthesis after the compound names indicate the weight ratio thereof if mixed) |
|---|---|
| Battery 1-1 | 1,1-diphenylethane (90), vinylene carbonate (10) |
| Battery 1-2 | 1,2-diphenylethane (90), vinylene carbonate (10) |
| Battery 1-3 | diphenylmethane (90), vinylene carbonate (10) |
| Battery 1-4 | 1,1-diphenylpropane (90), vinylene carbonate (10) |
| Battery 1-5 | 1,3-diphenylpropane (90), vinylene carbonate (10) |
| Battery 1-6 | 1,4-diphenylbutane (90), vinylene carbonate (10) |
| Battery 1-7 | 2,2-diphenyl-1,1,1,3,3,3-hexafluoropropane (90), vinylene carbonate (10) |
| Battery 1-8 | 1,1-diphenylethane (90), fluoroethylene carbonate (10) |
| Battery 1-9 | 1,1-diphenylpropane (90), fluoroethylene carbonate (10) |
| Battery 1-10 | 1,3-diphenylpropane (90), fluoroethylene carbonate (10) |
| Battery 1-11 | 1,4-diphenylbutane (90), fluoroethylene carbonate (10) |
| Battery 1-12 | 2,2-diphenyl-1,1,1,3,3,3-hexafluoropropane (90), fluoroethylene carbonate (10) |
| Battery 1-13 | 1,1-diphenylethane (90), vinylethylene carbonate (10) |
| Battery 1-14 | 1,1-diphenylpropane (90), vinylethylene carbonate (10) |
| Battery 1-15 | 1,3-diphenylpropane (90), vinylethylene carbonate (10) |
| Battery 1-16 | 1,4-diphenylbutane (90), vinylethylene carbonate (10) |
| Battery 1-17 | 2,2-diphenyl-1,1,1,3,3,3-hexafluoropropane (90), vinylethylene carbonate (10) |
| Battery 1-18 | 1,1-diphenylethane (85), 1,1-diphenylethylene (15) |
| Battery 1-19 | 1,1-diphenylpropane (90), 1,1-diphenylethylene (10) |
| Battery 1-20 | 1,3-diphenylpropane (90), 1,1-diphenylethylene (10) |
| Battery 1-21 | 1,4-diphenylbutane (90), 1,1-diphenylethylene (10) |
| Battery 1-22 | 2,2-diphenyl-1,1,1,3,3,3-hexafluoropropane (95), 1,1-diphenylethylene (5) |
| Battery 1-23 | 1,1-diphenylethane (90), ethylene sulfite (10) |
| Battery 1-24 | 1,1-diphenylpropane (90), ethylene sulfite (10) |
| Battery 1-25 | 1,3-diphenylpropane (90), ethylene sulfite (10) |
| Battery 1-26 | 1,4-diphenylbutane (90), ethylene sulfite (10) |
| Battery 1-27 | 2,2-diphenyl-1,1,1,3,3,3-hexafluoropropane (90), ethylene sulfite (10) |
| Battery 1-28 | 1,1-diphenylethane (90), 1,3-propane sultone (10) |
| Battery 1-29 | 1,1-diphenylpropane (90), 1,3-propane sultone (10) |
| Battery 1-30 | 1,3-diphenylpropane (90), 1,3-propane sultone (10) |
| Battery 1-31 | 1,4-diphenylbutane (90), 1,3-propane sultone (10) |
| Battery 1-32 | 2,2-diphenyl-1,1,1,3,3,3-hexafluoropropane (90), 1,3-propane sultone (10) |

Example 2

Coin type secondary batteries were produced in the same manner of Example 1 except for changing the purities only as set forth in Table 2. Batteries 1-1, 1-8, 1-13, 1-18, 1-23 and 1-28 produced in Example 1 are also set forth in the table as those with a compound purity of 99% or higher.

TABLE 2

| Battery | Compound (the values in the parenthesis after the compound names indicate the weight ratio thereof if mixed) | Purity % |
|---|---|---|
| Battery 1-1 | 1,1-diphenylethane (90), | 99 |
| Battery 2-1 | vinylene carbonate (10) | 97 |
| Battery 2-2 | | 90 |
| Battery 1-8 | 1,1-diphenylethane (90), | 99 |
| Battery 2-3 | fluoroethylene carbonate (10) | 97 |
| Battery 2-4 | | 90 |
| Battery 1-13 | 1,1-diphenylethane (90), | 99 |
| Battery 2-5 | vinylethylene carbonate (10) | 97 |
| Battery 2-6 | | 90 |
| Battery 1-18 | 1,1-diphenylethane (85), | 99 |
| Battery 2-7 | 1,1-diphenylethylene (15) | 97 |
| Battery 2-8 | | 90 |
| Battery 1-23 | 1,1-diphenylethane (90), | 99 |
| Battery 2-9 | ethylene sulfite (10) | 97 |
| Battery 2-10 | | 90 |
| Battery 1-28 | 1,1-diphenylethane (90), | 99 |
| Battery 2-11 | 1,3-propane sultone (10) | 97 |
| Battery 2-12 | | 90 |

Example 3

Coin type secondary batteries were produced in the same manner of Example 1 except for changing the added amount of compounds only as set forth in Table 3. Batteries 1-1, 1-8, 1-13, 1-18, 1-23 and 1-28 produced in Example 1 are also set forth in the table as those where compounds are added in an amount of 5% in total.

TABLE 3

| Battery | Compound (the values in the parenthesis after the compound names indicate the weight ratio thereof if mixed) | Added Amount, Mass % |
|---|---|---|
| Battery 1-1 | 1,1-diphenylethane (90), | 5 |
| Battery 3-1 | vinylene carbonate (10) | 0.05 |
| Battery 3-2 | | 10 |
| Battery 1-8 | 1,1-diphenylethane (90), | 5 |
| Battery 3-3 | fluoroethylene carbonate (10) | 0.05 |
| Battery 3-4 | | 10 |
| Battery 1-13 | 1,1-diphenylethane (90), | 5 |
| Battery 3-5 | vinylethylene carbonate (10) | 0.05 |
| Battery 3-6 | | 10 |
| Battery 1-18 | 1,1-diphenylethane (85), | 5 |
| Battery 3-7 | 1,1-diphenylethylene (15) | 0.05 |
| Battery 3-8 | | 10 |
| Battery 1-23 | 1,1-diphenylethane (90), | 5 |
| Battery 3-9 | ethylene sulfite(10) | 0.05 |
| Battery 3-10 | | 10 |
| Battery 1-28 | 1,1-diphenylethane (90), | 5 |
| Battery 3-11 | 1,3-propane sultone(10) | 0.05 |
| Battery 3-12 | | 10 |

Example 4

Coin type secondary batteries were produced in the same manner of Example 1 using organic solvents where the mix ratio of cyclic carbonate EC and chain carbonate DMC were changed as set forth in Table 4. Batteries 1-1, 1-8, 1-13, 1-18, 1-23 and 1-28 produced in Example 1 are also set forth in the table as those where the mix ratio of the EC and DMC is 3:7 by volume percent.

TABLE 4

| Battery | Compound (the values in the parenthesis after the compound names indicate the weight ratio thereof if mixed) | EC Vol. % | DMC Vol. % |
|---|---|---|---|
| Battery 1-1 | 1,1-diphenylethane (90), | 30 | 70 |
| Battery 4-1 | vinylene carbonate (10) | 8 | 92 |
| Battery 4-2 | | 50 | 50 |
| Battery 1-8 | 1,1-diphenylethane (90), | 30 | 70 |
| Battery 4-3 | fluoroethylene carbonate (10) | 8 | 92 |
| Battery 4-4 | | 50 | 50 |
| Battery 1-13 | 1,1-diphenylethane (90), | 30 | 70 |
| Battery 4-5 | vinylethylene carbonate (10) | 8 | 92 |
| Battery 4-6 | | 50 | 50 |
| Battery 1-18 | 1,1-diphenylethane (85), | 30 | 70 |
| Battery 4-7 | 1,1-diphenylethylene (15) | 8 | 92 |
| Battery 4-8 | | 50 | 50 |
| Battery 1-23 | 1,1-diphenylethane (90), | 30 | 70 |
| Battery 4-9 | ethylene sulfite (10) | 8 | 92 |
| Battery 4-10 | | 50 | 50 |
| Battery 1-28 | 1,1-diphenylethane (90), | 30 | 70 |
| Battery 4-11 | 1,3-propane sultone (10) | 8 | 92 |
| Battery 4-12 | | 50 | 50 |

Example 5

Coin type secondary batteries were produced as described above using natural graphite as an anode active material, active material: natural graphite of 91 percent by mass, a conductive agent: acetylene black of 1 percent by mass, and a binder: poly(vinylidene fluoride) of 8 percent by mass. The mass of the anode active material was about 12 mg.

Compounds were mixed as set forth in Table 5 below and used for the production of coin type secondary batteries as described above.

TABLE 5

| Battery | Compound (the values in the parenthesis after the compound names indicate the weight ratio thereof if mixed) |
|---|---|
| Battery 5-1 | 1,1-diphenylethane (80), vinylene carbonate (20) |
| Battery 5-2 | 1,1-diphenylethane (60), fluoroethylene carbonate (40) |
| Battery 5-3 | 1,1-diphenylethane (80), vinylethylene carbonate (20) |
| Battery 5-4 | 1,1-diphenylethane (80), ethylene sulfite (20) |
| Battery 5-5 | 1,1-diphenylethane (80), 1,3-propane sultone (20) |

Example 6

Coin type secondary batteries were produced in the same manner of Example 5 except for changing the added amount of a compound as set forth in Table 6. Batteries 5-1, 5-2, 5-3, 5-4 and 5-5 produced in Example 5 are also set forth in the table as those where compounds were added in an amount of 5% in total.

TABLE 6

| Battery | Compound (the values in the parenthesis after the compound names indicate the weight ratio thereof if mixed) | Added Amount Mass % |
|---|---|---|
| Battery 5-1 | 1,1-diphenylethane (80), vinylene carbonate (20) | 5 |
| Battery 6-1 | 1,1-diphenylethane (50), vinylene carbonate (50) | 1 |
| Battery 6-2 | 1,1-diphenylethane (65), vinylene carbonate (35) | 20 |
| Battery 5-2 | 1,1-diphenylethane (60), fluoroethylene carbonate (40) | 5 |
| Battery 6-3 | 1,1-diphenylethane (50), fluoroethylene carbonate (50) | 1 |
| Battery 6-4 | 1,1-diphenylethane (10), fluoroethylene carbonate (90) | 20 |
| Battery 5-3 | 1,1-diphenylethane (80), vinylethylene carbonate (20) | 5 |
| Battery 6-5 | 1,1-diphenylethane (50), vinylethylene carbonate (50) | 1 |
| Battery 6-6 | 1,1-diphenylethane (75), vinylethylene carbonate (25) | 20 |
| Battery 5-4 | 1,1-diphenylethane (80), ethylene sulfite (20) | 5 |
| Battery 6-7 | 1,1-diphenylethane (50), ethylene sulfite (50) | 1 |
| Battery 6-8 | 1,1-diphenylethane (65), ethylene sulfite (35) | 20 |
| Battery 5-3 | 1,1-diphenylethane (80), 1,3-propane sultone (20) | 5 |
| Battery 6-9 | 1,1-diphenylethane (50), 1,3-propane sultone (50) | 1 |
| Battery 6-10 | 1,1-diphenylethane (65), 1,3-propane sultone (35) | 20 |

Example 7

Coin type secondary batteries were produced in the same manner of Example 5 using organic solvents where the mix ratio of cyclic carbonate EC and chain carbonate DMC were changed as set forth in Table 7. Batteries 5-1, 5-2, 5-3, 5-4 and 5-5 produced in Example 5 are also set forth in the table as those where the mix ratio of the EC and DMC was 3:7 by volume percent.

TABLE 7

| Battery | Compound (the values in the parenthesis after the compound names indicate the weight ratio thereof if mixed) | EC Vol. % | DMC Vol. % |
|---|---|---|---|
| Battery 5-1 | 1,1-diphenylethane (80), vinylene carbonate (20) | 30 | 70 |
| Battery 7-1 | | 8 | 92 |
| Battery 7-2 | | 50 | 50 |
| Battery 5-2 | 1,1-diphenylethane (60), fluoroethylene carbonate (40) | 30 | 70 |
| Battery 7-3 | | 8 | 92 |
| Battery 7-4 | | 50 | 50 |
| Battery 5-3 | 1,1-diphenylethane (80), vinylethylene carbonate (20) | 30 | 70 |
| Battery 7-5 | | 8 | 92 |
| Battery 7-6 | | 50 | 50 |
| Battery 5-4 | 1,1-diphenylethane (80), ethylene sulfite (20) | 30 | 70 |
| Battery 7-7 | | 8 | 92 |
| Battery 7-8 | | 50 | 50 |
| Battery 5-5 | 1,1-diphenylethane (80), 1,3-propane sultone (20) | 30 | 70 |
| Battery 7-9 | | 8 | 92 |
| Battery 7-10 | | 50 | 50 |

Example 8

Figure 2:
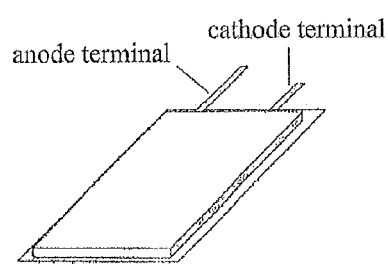
FIG. 2 is a schematic view of a pouch type secondary battery

A cathode and an anode (anode active material was an artificial graphite) were produced by coating and drying in the same manner as described above and then pressed by roll-pressing and cut to have an electrode-applied portion of 30 mm×50 mm thereby producing a cathode sheet and an anode sheet, respectively. The cathode and anode had an active material amount of about 200 mg and an active material amount of about 120 mg, respectively. The cathode and anode sheets were laminated with a 25 micrometer thick polypropylene-made separator, and an aluminum cathode terminal 22 (FIG. 2) and a nickel anode terminal 21 (FIG. 2) were welded to the current collector parts (uncoated parts) of the cathode and anode, respectively. The resulting assembly was wrapped with an aluminum laminate film with a thickness of about 100 micrometers, and the interior was filled with each of variously prepared electrolytes. The film was sealed under reduced pressure by thermal fusion bonding of the periphery thereby producing a pouch type secondary battery. The pouch type secondary battery is schematically shown in FIG. 2. EC that is a high-dielectric solvent and DMC that is a low viscosity solvent were used as an organic solvent, and were mixed at a volume ratio of 3:7 to produce a solvent in which $LiPF_6$ was dissolved at 1 mol/L. All of the compounds to be added to the above-described organic electrolytes were prepared to be 99% or higher in purity and added in an amount of 5 percent by mass of the electrolyte.

Compounds were mixed as set forth in Table 8 below, and pouch type secondary batteries were produced as described above.

TABLE 8

| Battery | Compound (the values in the parenthesis after the compound names indicate the weight ratio thereof if mixed) |
|---|---|
| Battery 8-1 | 1,1-diphenylethane (90), vinylene carbonate (10) |
| Battery 8-2 | 1,1-diphenylethane (90), fluoroethylene carbonate (10) |
| Battery 8-3 | 1,1-diphenylethane (90), vinylethylene carbonate (10) |
| Battery 8-4 | 1,1-diphenylethane (90), ethylene sulfite (10) |
| Battery 8-5 | 1,1-diphenylethane (90), 1,3-propane sultone (10) |

Comparative Example 1

Coin type secondary batteries containing a compound represented by formula (1) only and that containing no compound as set forth in Table 9 were produced in the same manner of Example 1.

TABLE 9

| Battery | Compound |
|---|---|
| Comparative 1-1 | 1,1-diphenylethane |
| Comparative 1-2 | 1,2-diphenylethane |
| Comparative 1-3 | diphenylmethane |
| Comparative 1-4 | 1,1-diphenylpropane |
| Comparative 1-5 | 1,3-diphenylpropane |
| Comparative 1-6 | 1,4-diphenylbutane |
| Comparative 1-7 | 2,2-diphenyl-1,1,1,3,3,3-hexafluoropropane |
| Comparative 1-8 | none |

Comparative Example 2

A coin type secondary battery containing a compound represented by formula (1) only and that containing no compound as set forth in Table 10 were produced in the same manner of Example 5.

TABLE 10

| Battery | Compound |
|---|---|
| Comparative 2-1 | 1,1-diphenylethane |
| Comparative 2-2 | none |

Comparative Example 3

A pouch type secondary battery containing a compound represented by formula (1) only and that containing no compound as set forth in Table 11 were produced in the same manner of Example 8.

TABLE 11

| Battery | Compound |
|---|---|
| Comparative 3-1 | 1,1-diphenylethane |
| Comparative 3-2 | none |

The coin type and pouch type secondary batteries produced above were placed in a thermostat bath kept at room temperature and then subjected to a charge and discharge test. After charging was carried out at a constant electric current of 0.875 mA and a constant voltage of 4.20 V for eight hours, discharging was carried out to 3.00 V at a constant electric current of 0.875 mA. For the pouch type secondary batteries, a constant electric current of 7.50 mA was used.

Figure 3:
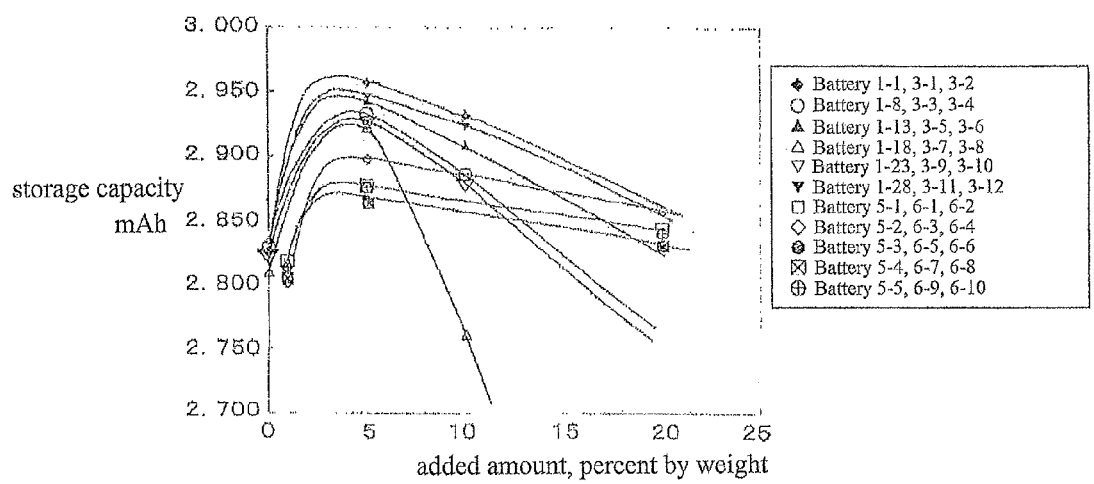
FIG. 3 is a graph showing the relationship between the added amount of a compound and an initial storage capacity
Figure 4:
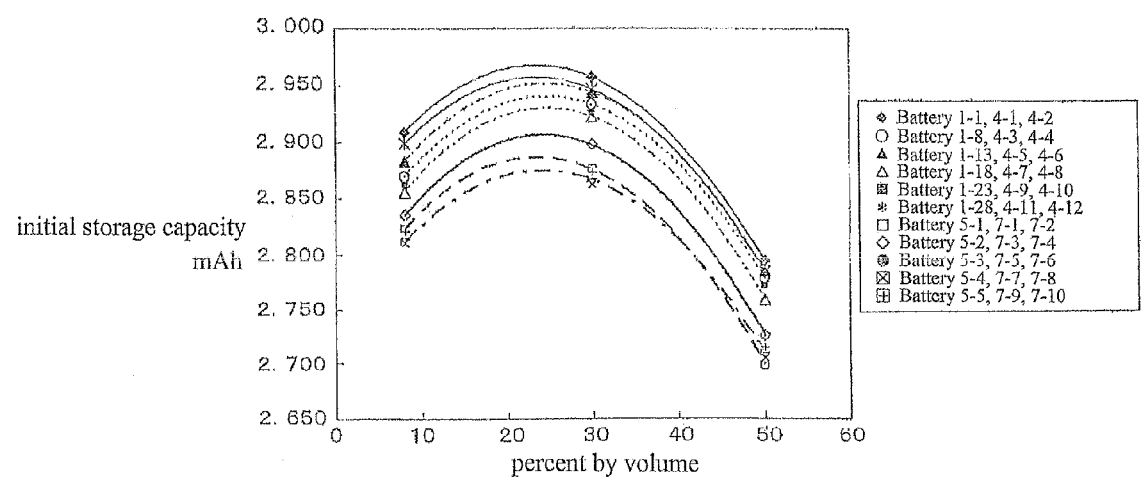
FIG. 4 is a graph showing the relationship between the volume percent of ethylene carbonate (EC) in an organic electrolyte and the initial storage capacity

The initial storage capacity of each battery and capacity ratio thereof to Comparative Examples (no compound was added) whose capacity was defined as 100 were set forth in Table 12 (for Examples 1 to 4, Example 5 to 7 and Example 8, the volumes of Comparative 1-2, Comparatives 2-2 and Comparatives 3-2 were defined as 100, respectively). The relationship between the added amount of a compound and the initial storage capacity and the relationship between the ratio of ethylene carbonate (EC) contained in the organic electrolytes and the initial storage capacity are plotted in FIG. 3 and FIG. 4, respectively.

TABLE 12

| Battery | Initial Storage Cpapcity mAh (Capacity Ratio) |
|---|---|
| Battery 1-1 | 2.958 (105) |
| Battery 1-2 | 2.925 (104) |
| Battery 1-3 | 2.909 (104) |
| Battery 1-4 | 2.956 (105) |
| Battery 1-5 | 2.954 (105) |
| Battery 1-6 | 2.950 (105) |
| Battery 1-7 | 2.953 (105) |
| Battery 1-8 | 2.933 (104) |
| Battery 1-9 | 2.931 (104) |
| Battery 1-10 | 2.929 (104) |
| Battery 1-11 | 2.926 (104) |
| Battery 1-12 | 2.928 (104) |
| Battery 1-13 | 2.944 (105) |
| Battery 1-14 | 2.942 (105) |
| Battery 1-15 | 2.940 (105) |
| Battery 1-16 | 2.936 (105) |
| Battery 1-17 | 2.939 (105) |
| Battery 1-18 | 2.923 (104) |
| Battery 1-19 | 2.921 (104) |
| Battery 1-20 | 2.919 (104) |
| Battery 1-21 | 2.915 (104) |
| Battery 1-22 | 2.918 (104) |
| Battery 1-23 | 2.926 (104) |
| Battery 1-24 | 2.924 (104) |
| Battery 1-25 | 2.922 (104) |
| Battery 1-26 | 2.919 (104) |
| Battery 1-27 | 2.921 (104) |
| Battery 1-28 | 2.947 (105) |
| Battery 1-29 | 2.945 (105) |
| Battery 1-30 | 2.943 (105) |
| Battery 1-31 | 2.940 (105) |
| Battery 1-32 | 2.942 (105) |
| Battery 2-1 | 2.894 (103) |
| Battery 2-2 | 2.446 (87) |
| Battery 2-3 | 2.882 (103) |
| Battery 2-4 | 2.445 (87) |
| Battery 2-5 | 2.886 (103) |
| Battery 2-6 | 2.425 (86) |
| Battery 2-7 | 2.815 (100) |
| Battery 2-8 | 2.332 (83) |
| Battery 2-9 | 2.875 (102) |
| Battery 2-10 | 2.439 (87) |
| Battery 2-11 | 2.883 (103) |
| Battery 2-12 | 2.437 (87) |
| Battery 3-1 | 2.833 (101) |
| Battery 3-2 | 2.932 (104) |
| Battery 3-3 | 2.828 (101) |
| Battery 3-4 | 2.885 (103) |
| Battery 3-5 | 2.829 (101) |
| Battery 3-6 | 2.908 (104) |
| Battery 3-7 | 2.809 (100) |
| Battery 3-8 | 2.761 (98) |
| Battery 3-9 | 2.822 (100) |
| Battery 3-10 | 2.879 (103) |
| Battery 3-11 | 2.823 (101) |
| Battery 3-12 | 2.922 (104) |
| Battery 4-1 | 2.910 (104) |
| Battery 4-2 | 2.794 (100) |
| Battery 4-3 | 2.870 (102) |
| Battery 4-4 | 2.778 (99) |
| Battery 4-5 | 2.883 (103) |
| Battery 4-6 | 2.784 (99) |
| Battery 4-7 | 2.856 (102) |
| Battery 4-8 | 2.758 (98) |
| Battery 4-9 | 2.863 (102) |
| Battery 4-10 | 2.771 (99) |
| Battery 4-11 | 2.899 (103) |
| Battery 4-12 | 2.785 (99) |
| Battery 5-1 | 2.876 (105) |
| Battery 5-2 | 2.898 (106) |
| Battery 5-3 | 2.867 (105) |
| Battery 5-4 | 2.863 (104) |
| Battery 5-5 | 2.874 (105) |
| Battery 6-1 | 2.817 (103) |
| Battery 6-2 | 2.842 (104) |
| Battery 6-3 | 2.801 (102) |

TABLE 12-continued

| Battery | Initial Storage Cpapcity mAh (Capacity Ratio) |
|---|---|
| Battery 6-4 | 2.857 (104) |
| Battery 6-5 | 2.817 (103) |
| Battery 6-6 | 2.830 (103) |
| Battery 6-7 | 2.804 (102) |
| Battery 6-8 | 2.829 (103) |
| Battery 6-9 | 2.814 (103) |
| Battery 6-10 | 2.839 (104) |
| Battery 7-1 | 2.823 (103) |
| Battery 7-2 | 2.699 (98) |
| Battery 7-3 | 2.835 (103) |
| Battery 7-4 | 2.726 (99) |
| Battery 7-5 | 2.811 (103) |
| Battery 7-6 | 2.709 (99) |
| Battery 7-7 | 2.810 (103) |
| Battery 7-8 | 2.705 (99) |
| Battery 7-9 | 2.821 (103) |
| Battery 7-10 | 2.715 (99) |
| Battery 8-1 | 24.78 (105) |
| Battery 8-2 | 24.36 (103) |
| Battery 8-3 | 24.45 (104) |
| Battery 8-4 | 24.51 (104) |
| Battery 8-5 | 24.69 (105) |
| Comparative 1-1 | 2.891 (103) |
| Comparative 1-2 | 2.860 (102) |
| Comparative 1-3 | 2.840 (101) |
| Comparative 1-4 | 2.889 (103) |
| Comparative 1-5 | 2.888 (103) |
| Comparative 1-6 | 2.884 (103) |
| Comparative 1-7 | 2.886 (103) |
| Comparative 1-8 | 2.808 (100) |
| Comparative 2-1 | 2.773 (101) |
| Comparative 2-2 | 2.741 (100) |
| Comparative 3-1 | 23.89 (101) |
| Comparative 3-2 | 23.58 (100) |

From the above results, it is apparent that addition of the compound of the present invention to an organic solvent where a high-dielectric solvent and a low viscosity solvent are mixed at an appropriate ratio is effective in increasing the initial storage capacity.

INDUSTRIAL APPLICABILITY

The organic electrolyte of the present invention can increase the initial storage capacity of a secondary battery, and thus the possible cruising range of an electric vehicle equipped with a secondary battery containing the organic electrolyte of the present invention can be extended.

The invention claimed is:

1. An organic electrolyte comprising 1,1-diphenylethane and a compound represented by formula (2) below:

$$R_1\text{---}R_2\text{---}R_3 \qquad (2)$$

wherein $R_2$ is a vinyl group having no substituent or having a substituent bonded thereto, a cyclic carbonic acid ester group, cyclic sulfite group, chain carbonic acid ester group or chain sulfite group, having no substituent or having a substituent bonded thereto, or —$SO_3$—, $R_1$ and $R_3$ are each independently hydrogen, a halogen, a straight-chain or branched alkyl group having one to four carbon atoms, a halogen-containing straight-chain or branched alkyl group having one to four carbon atoms, or a vinyl, phenyl or cyclohexyl group, having no substituent or having a substituent bonded thereto, and when $R_2$ is —$SO_3$—, $R_1$ and $R_3$ may bond to each other to form a ring.

2. The organic electrolyte according to claim 1, wherein 1,1-diphenylethane is contained in an amount of 0.04 to 15 percent by mass in the organic electrolyte.

3. The organic electrolyte according to claim 1, wherein the compound represented by formula (2) is contained in an amount of 0.005 to 20 percent by mass in the organic electrolyte.

4. The organic electrolyte according to claim 1, wherein the blend ratio of 1,1-diphenylethane and the compound represented by formula (2) is 1:0.01 to 10 by weight ratio.

5. The organic electrolyte according to claim 1, wherein the compound represented by formula (2) is 1,1-diphenylethylene.

6. The organic electrolyte according to claim 1, wherein the compound represented by formula (2) is fluoroethylene carbonate.

7. The organic electrolyte according to claim 1, wherein the compound represented by formula (2) is vinylene carbonate and contained in an amount of 0.005 to 7 percent by mass in the organic electrolyte.

8. The organic electrolyte according to claim 1, wherein the compound represented by formula (2) is vinylethylene carbonate and contained in an amount of 0.005 to 5 percent by mass in the organic electrolyte.

9. The organic electrolyte according to claim 1, wherein it contains a high-dielectric solvent in an amount of 5 to 45 percent by volume.

10. An organic electrolyte storage battery comprising the organic electrolyte according to claim 1.

* * * * *